United States Patent
Wang

(10) Patent No.: US 7,822,497 B2
(45) Date of Patent: Oct. 26, 2010

(54) ELECTRONIC DEVICE HAVING MUSIC DATABASE AND METHOD OF FORMING MUSIC DATABASE

(75) Inventor: Hao Wang, Beijing (CN)

(73) Assignee: Nokia Corporation, Espoo (FI)

( * ) Notice: Subject to any disclaimer, the term of this patent is extended or adjusted under 35 U.S.C. 154(b) by 1108 days.

(21) Appl. No.: 10/946,808

(22) Filed: Sep. 21, 2004

(65) Prior Publication Data

US 2005/0091278 A1 Apr. 28, 2005

(30) Foreign Application Priority Data

Sep. 28, 2003 (CN) ................. 03 1 26460

(51) Int. Cl.
*G06F 17/00* (2006.01)
(52) U.S. Cl. .................... 700/94; 707/104.1
(58) Field of Classification Search .......... 700/94; 707/104.1
See application file for complete search history.

(56) References Cited

U.S. PATENT DOCUMENTS

| 5,739,451 | A | 4/1998 | Winksy et al. ............ 84/609 |
| 5,864,868 | A | 1/1999 | Contois ................. 707/104 |
| 6,647,496 | B1 * | 11/2003 | Tagawa et al. ........... 713/193 |
| 6,826,174 | B1 * | 11/2004 | Erekson et al. .......... 370/352 |
| 2002/0078819 | A1 | 6/2002 | Kim .................... 84/609 |
| 2002/0194355 | A1 | 12/2002 | Morita et al. ........... 709/231 |

FOREIGN PATENT DOCUMENTS

| CN | 1381808 A | 11/2002 |
| EP | 1 172 796 A1 | 1/2002 |

OTHER PUBLICATIONS

Nullsoft, Winamp 2.95 (released Jun. 24, 2003) (retrieved Feb. 3, 2008), 7 pages.*
WareSeeker, http://wareseeker.com/Audio-Mutimedia/winamp-2.95.zip/283894 (retrieved Feb. 3, 2008), 3 pages.*
ActiveWin, http://web.archive.org/web/20020209182444/http://www.activewin.com/winxp/sysreqs.shtml (archived Feb. 9, 2002) (retrieved Feb. 3, 2008), 2 pages.*
Richter, CoverTAG 1.8 (released Mar. 10, 2001) (retrieved Feb. 3, 2008), 6 pages.*
Columbus, Update on Windows XP Professional Installs in the Real World, informIT, http://www.informit.com/articles/article.aspx?p=23340 (Sep. 14, 2001) (retrieved Feb. 3, 2008), 2 pages.*
Nullsoft, Winamp 2.95 (released Jun. 24, 2003) (retrieved Mar. 15, 2009), 1 page.*

* cited by examiner

*Primary Examiner*—Walter F Briney, III
(74) *Attorney, Agent, or Firm*—Harrington & Smith

(57) ABSTRACT

An electronic device is disclosed according to the invention, which comprises an input unit, a memory unit for storing a music database, a display unit and a control unit. The music database comprises a plurality of pieces of music attached with visual tags. The electronic device according to the invention can facilitate the users to quickly and efficiently search out what they want to listen. Further, a method of forming the music database for the electronic device is also disclosed.

8 Claims, 3 Drawing Sheets

ELECTRONIC DEVICE HAVING MUSIC DATABASE AND METHOD OF FORMING MUSIC DATABASE

FIELD OF THE INVENTION

The invention relates to an electronic device having a music database and a method of forming the music database, and in particular to an electronic device by which users are capable of editing, browsing and retrieving any piece of music stored in the music database of the electronic device with ease, and the method of forming the music database.

BACKGROUND OF THE INVENTION

With the fast development of hardware technology, the abilities of an electronic device, such as a mobile terminal, to process data and to store information are remarkably improved, by which users can enjoy kinds of multimedia applications anytime and anywhere. As an example, many new models of mobile phones integrate MP3 player and/or radio, which can provide music and broadcast programs to the users.

Conventionally, users of an electronic device having a music database can browse or retrieve music stored in the music database, and find out, if needed, a piece of music, by entering descriptive keywords, such as title, performer and composer of the piece of music, to listen or to download it to other devices.

When users browse or retrieve one or more pieces of music from a music database stored in the electronic device, a menu or a list of pieces of music is displayed on the display unit of the electronic device. The menu or list shows, usually in text mode, a large number of titles, names of performers, names of composers etc. of the pieces of music to be selected. The users need to select what they want from the menu or list based on a certain rule such as alphabet order. Usually, the users have to check many pages or screens in the menu or list to find the right piece. Therefore, it is inconvenient for the users to find the exactly relevant information.

And, if users want to search a piece of music expressing a kind of mood such as happy, sad, sorrowful or the like they never listen to or they are not familiar with, they can hardly use the above menu or list to search out the right piece of music they want. Listening to the pieces of music one by one is not advisable because it is time consuming to check the melody of every piece of music, which in some sense depends on the length of the music. Even if only the major melody of every piece of music is listened to, it will take tens of seconds for one piece of music.

SUMMARY OF THE INVENTION

An object of the invention is to provide an electronic device having a music database, users of which can easily edit, browse and retrieve any piece of music included in the music database.

A further object of the invention is to provide a method of forming the music database, by which the music database in the electronic device can be formed.

In order to fulfill the above-mentioned objects, an electronic device is provided according to the invention. The electronic device comprises an input unit for inputting operation instructions, a control unit for receiving the operation instructions from the input unit and issuing relevant control commands, a memory unit for storing a music database comprising a plurality of pieces of music, and a display unit for selectively displaying the information of the pieces of music in response to the control commands from the control unit, wherein the pieces of music are attached with visual tags.

Also, a method of forming a music database is provided according to the invention. It comprises the following steps of: reading a piece of music from a set of stored pieces of music; producing a visual tag based on the relevant information of the piece of music; combining the piece of music and the visual tag to compose a piece of music having the visual tag; storing the composed piece of music having visual tag into the memory of an electronic device; repeating the above steps to form the music database, consisting of the pieces of music having visual tags stored in the memory, for the electronic device.

Since the electronic device according to the invention is provided with a music database formed by a plurality of pieces of music having visual tags, the users of the electronic device can easily recognize every piece of music by means of the visual tags attached to the pieces of music, and search out the right piece accordingly. Thus, the electronic device according to the invention can help the users to quickly and efficiently search out what they want without needing to listen to the pieces of music one by one.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

Figure 1:
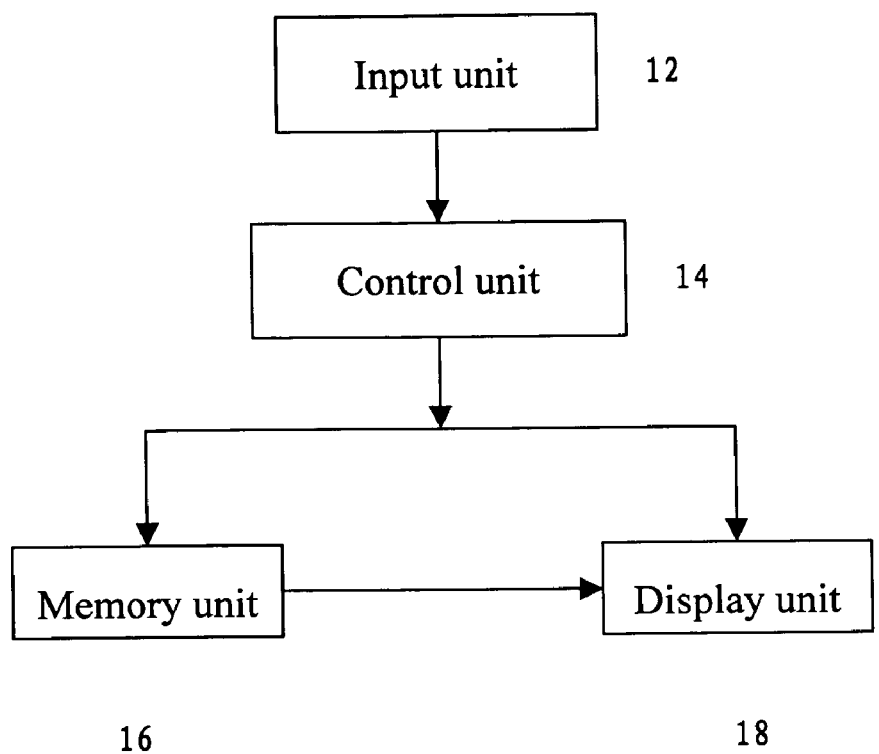
FIG. 1 is a schematic view showing an electronic device according to the invention.

FIG. 1 is a schematic view showing an electronic device according to the invention. As shown in FIG. 1, the electronic device according to the invention includes an input unit 12, a control unit 14, a memory unit 16 and a display unit 18. A music database is stored in the memory unit 16. The music database is formed by a plurality of pieces of music. Every piece of music is attached with a visual tag.

Users use the input unit 12 to input operation instructions to perform a desired operation. The control unit 14 receives the operation instructions and issues relevant control commands to control the operations of the memory unit 16 and the display unit 18. The display unit 18 selectively displays the information of the pieces of music stored in the memory unit 16 in response to the control command from the control unit 14.

The input unit 12 may be a keyboard or a touch screen etc. that is adapted to edit, browse, and retrieve the pieces of music attached with visual tags. The control unit 14 may be a CPU or MPU or the like. The memory unit 16 may be any device that can store information such as a flexible disk, a hard disk, an optical disk, a magnetooptic disk, a CD-ROM, a CD-R, a magnetic tape, a non-volatile memory card, a ROM, an EEPROM or the like. The display unit 18 may be a display or the like that is adapted to display the visual tags.

A visual tag for a piece of music includes an icon comprising one or more basic elements, which can represent in a sense the piece of music. Usually, the basic elements forming the icon carry the most impressive information of the piece of music. Whatever can be displayed on the display unit, such as a small image, a sketch picture, a symbol, an animation graph and the like, can be used as the basic elements of the visual tag.

Usually, when a user makes a search for a desired piece of music, the icon of the visual tag of the piece of music is displayed on the display unit 18 to help the user to recognize the piece of music having the visual tag.

In addition, the visual tag for the piece of music can include some additional elements, such as descriptive words, like music titles, names of composers and the like. These additional elements are usually not displayed on the display unit 18. When a user has a general feeling on a piece of music through the icon of the visual tag attached to the piece of music, and wants to know more information about this piece of music, the additional elements also can be displayed on the display 18 as required.

For Example, all the additional elements of a visual tag for a piece of music are listed in a menu that is usually not displayed on the display unit 18. When a user performs an operation, such as highlighting the visual tag, the menu will be displayed on the display unit 18 to show part or all of the additional elements of the visual tag so that the user can have more understandings of the piece of music.

Any elements of a visual tag can be set as basic or additional elements as required.

The basic elements and the additional elements may be any one of the following: "music title", "composer", "performer", "music type", "mood", "academic classification", "main instrument", "related drawing", "personal feeling", "impression level", "melody curve", "recalling melody" and "hot link" etc.

If any one or more of the above elements are taken as the basic elements of the visual tag of a piece of music, an icon is formed by the elements and is usually displayed on the display unit 18. The additional elements are listed in a menu that will be displayed on the display 18 if required.

The element "music title" indicates the title of a piece of music, such as "American quartet".

The element "composer and/or performer" indicates the name or photo of the person who composed or performed this piece of music.

The element "music type" means the type of a piece of music, such as midi, rock, chamber music, song etc.

The element "mood" indicates the predominant mood expressed by a piece of music, such as happy, sad, excited, horrible, proud etc. It may be displayed as different face marks that can express different human modes respectively.

The element "academic classification" means the musical forms in the academic point of view, such as sonata, symphony, concerto etc.

The element "main instrument" means an instrument, with which the music was played, such as piano, violin, harp etc. It may be displayed in a picture of the instrument.

The element "related drawing" means a drawing or picture which best describes the impression and imagination of a listener's feelings, such as a flying bird, a bright moon over the peaceful surface of a lake, a mountain and so on. It may be displayed in a bitmap. In a common sense, the drawing or picture expresses the popular feelings of the majority of listeners.

The element "personal feeling" means the personal feelings of the listener, which is similar to the above-mentioned element "related drawing". It may be displayed as a small mark.

The element "impression level" means a score representing the satisfaction degree the listener gives after he listened to this music, such as five stars, four stars, etc. It may be indicated with a number or star marks, such as ★★★★(three and a half stars).

Figure 2:
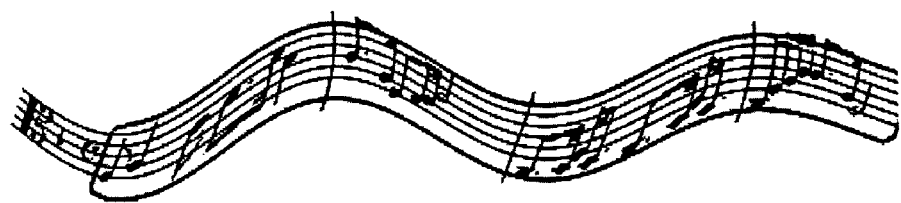
FIG. 2 is a graph showing a melody of a piece of music.

The element "melody curve" means a curve whose shape shows the melody of a piece of music, such as the curve as shown in FIG. 2. The melody curve can reflect the rhythm and tone of the piece of music.

The element "recalling melody" means a melody or a segment of melody representing a piece of music, which is the most representative part of the music and is much easier for the listener to remember or recognize the piece of music.

The element "hot link" means the links to other related visual tags.

The recalling melody of a piece of music may be obtained based on human-machine-interaction. With the use of some sensors, which can pick up the emotions and/or physiological reactions of persons listening to the piece of music, the most exciting segment of the piece of music can be extracted by automatically analyzing the records of these sensors. The parameters, such as the expressions/emotion and the heartbeat of the listeners, of the records will be obviously changed when persons hear the most exciting or interesting segments. In this way, the recalling melody of the piece of music could be easily obtained.

The recalling melody also may be obtained by counting the repeating times of a segment of music within the playing period of the piece of music. The segment of music being repeated most frequently can be taken as the recalling melody representing the piece of music, which can be extracted as an element of the visual tag of the piece of music.

According to the invention, users can edit, browse and retrieve the basic elements and additional elements of a visual tag for a piece of music by means of the input unit 12. Further, the input unit 12 is adapted to match and to associate with a piece of music with a typical visual tag provided in a standard tag database.

Further, the electronic device having a music database according to the invention includes an interface (not shown) for connecting the electronic device with a web server or provider server to download some useful materials, e.g., a standard visual tag, or some special symbols or icons users might use in editing the visual tags.

The music database in the electronic device according to the invention can be firstly constituted by means of a specific tool and then inputted in the electronic device. Alternatively, the music database can be formed directly in the electronic device according to the invention.

The following is a brief description about how to constitute the music database for the electronic device according to the invention.

Figure 3:
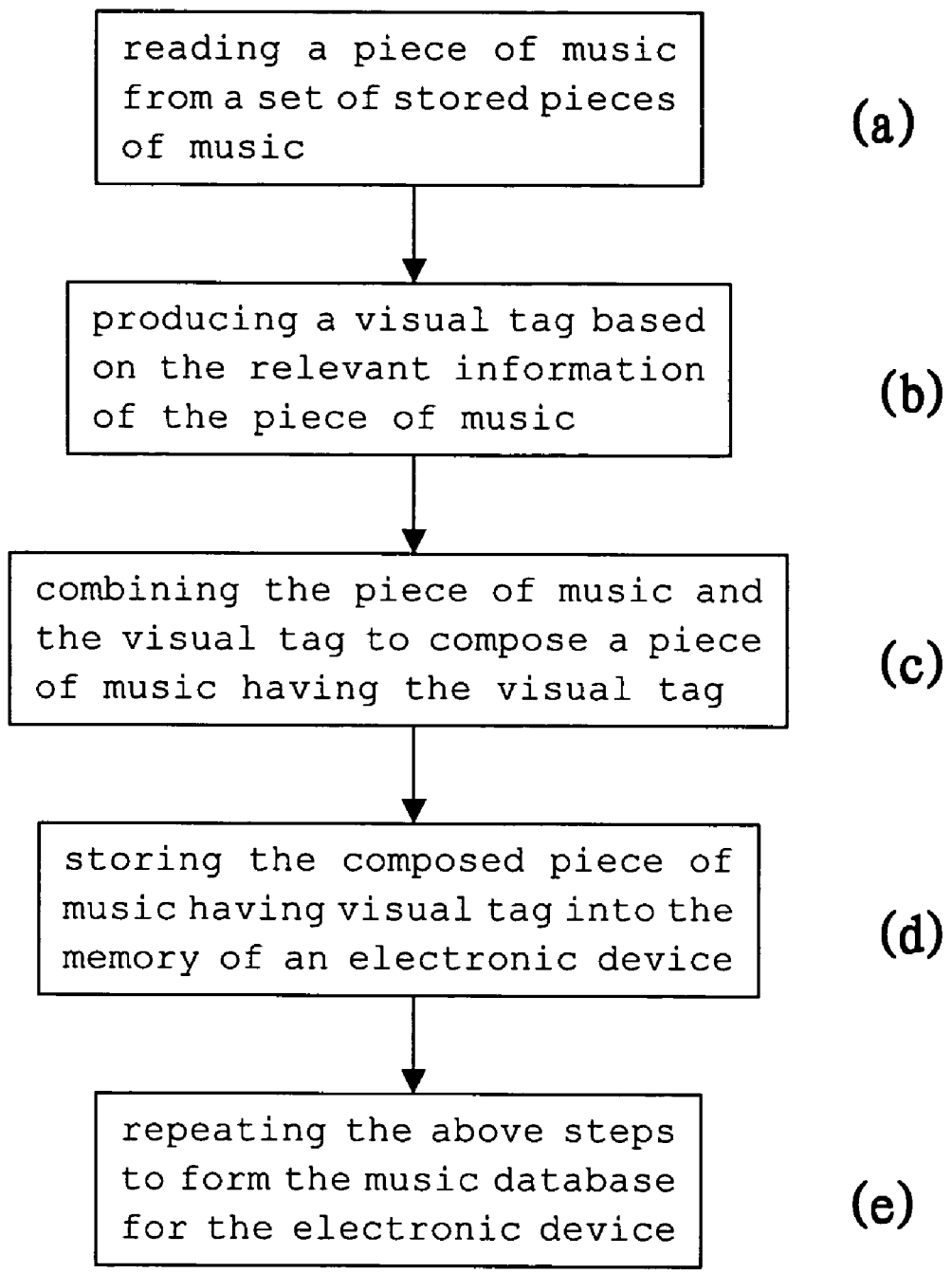
FIG. 3 is a flow chart showing the method of forming the music data base according to the invention.

As shown in FIG. 3, the method of forming a music database according to the invention includes the following steps: (a) reading a piece of music from a set of stored pieces of music; (b) producing a visual tag based on the relevant information of the piece of music; (c) combining the piece of music and the visual tag to compose a piece of music having the visual tag; (d) storing the composed piece of music having visual tag into the memory of an electronic device; (e) repeating the above steps to form the music database, consisting of the pieces of music having visual tags stored in the memory, for the electronic device according to the invention.

The set of stored pieces of music may be stored in a remote database to which a data transmission connection can be set up, or stored locally. As mentioned above, the visual tag is formed based on the relevant information of the piece of music. The relevant information refers to basic elements and additional elements of the piece of music. The visual tag produced in step (b) includes an icon comprising one or more basic elements, and, if necessary, additional elements reflecting respectively one or more features of the piece of music.

The icon is preferably formed by one or more basic elements carrying the most impressive information of the piece of music and displayed on the display unit 18 when the piece of music needs to be displayed. The additional elements are arranged in a menu, and displayed if required. For simplicity, the more detailed description thereof is omitted.

The visual tag for a piece of music can be produced by a database management center or web server/information center site (not shown) either by means of an automatic composer or by means of manual/semi-automatic composer. The automatic generation of the visual tag should follow a standard format, which specifies the forms of each element and their layout in the visual tag. After the visual tag is created, it can be delivered together with the piece of music everywhere.

Figure 4:
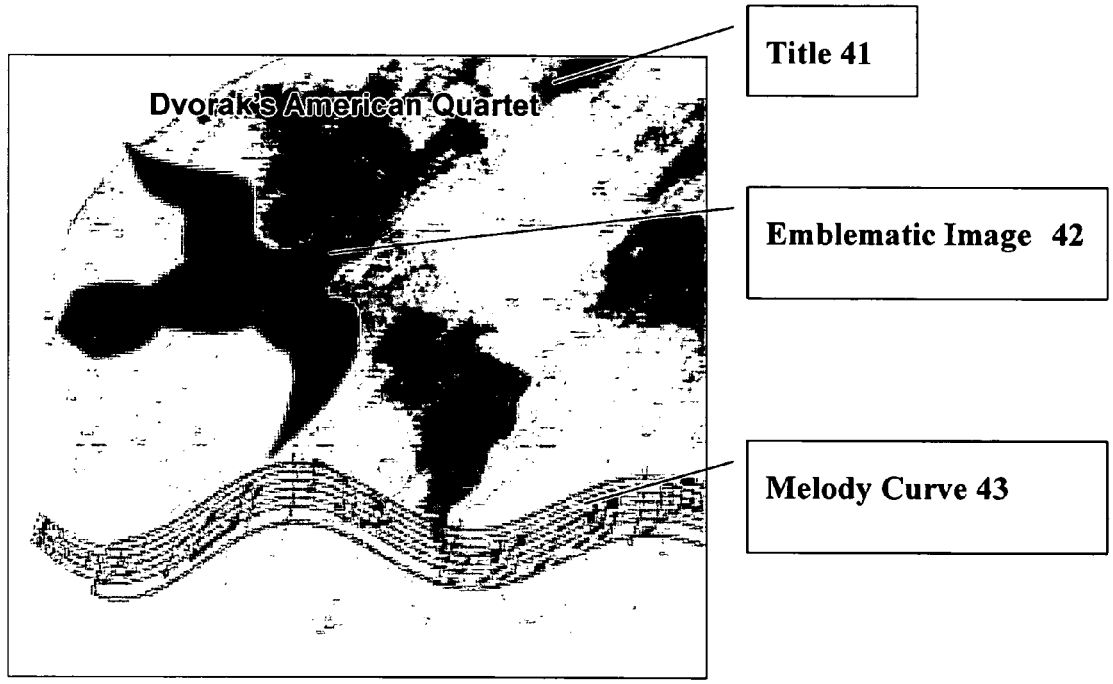
FIG. 4 is an example of a visual tag for a piece of music.

FIG. 4 shows an icon of a visual tag attached to the piece of music titled "Dvorak's American Quartet". As shown in FIG. 4, the basic elements constituting the icon of the visual tag include a title 41, an emblematic image 42 and a melody curve 43. The emblematic image 42 is a "red bird, only with black wings". The visual tag also includes additional elements (not shown).

The music database in the electronic device according to the invention can be easily edited by means of the input unit 12. The users of the electronic device according to the invention can either re-map the visual tags attached to the pieces of music or add, change or delete one or more elements of the visual tags attached to the piece of music to form a personal music database.

By displaying the icons of the visual tags of all or a part of pieces of music on the display unit 18, users of the electronic device according to the invention can browse the pieces of music. It is very easy and efficient to recognize a piece of music through the icon of the visual tag of the piece of music.

The pieces of music can also be retrieved easily due to the visual tags. Both basic elements and additional elements of the visual tags of the pieces of music can be taken as the index for retrieval.

The electronic device according to the invention can be a mobile phone, a portable computer and any other electronic devices provided with a music database.

The pieces of music may be songs, ringing tone and whatever persons can hear.

The present invention has been described in detail with respect of the preferred embodiment. It will now be apparent from foregoing to those skilled in the art that changes and modifications may be made without departing from the invention in its broader aspects, and it is the intention that the appended claims cover all such changes and modifications falling into the true scope of the invention.

What is claimed is:

1. An electronic device, comprising:
an input configured to input operation instructions;
a controller configured to receive the operation instructions from said input and issuing relevant control commands,
a memory configured to store a music database comprising a plurality of pieces of music, and
a display configured to display selectively the pieces of music in response to the control commands from said controller;
wherein the controller is configured to:
read a piece of music from the plurality of stored pieces of music;
produce a visual tag based on information of the piece of music, said visual tag includes an icon comprising a plurality of elements, each element carrying information relating to the piece of music;
combine the piece of music and the visual tag to compose a piece of music having the visual tag;
store the composed piece of music having visual tag into the memory; and
repeat the above steps to form the music database, comprising the pieces of music having visual tags stored in the memory.

2. The electronic device as claimed in claim 1, wherein the controller unit is further configured to receive a highlighting of said visual tag and in response thereto display at least one additional element.

3. The electronic device as claimed in claim 1, wherein each element carries information relating to one taken from a group comprising composer, performer, mood, main instrument, related drawing, personal feeling, impression level, melody curve and hot link.

4. The electronic device as claimed in claim 1, wherein said electronic device is a mobile phone.

5. The electronic device as claimed in claim 1, wherein said electronic device is a portable computer.

6. A method of forming a music database, comprising:
reading a piece of music from a set of stored pieces of music;
producing a visual tag based on information of the piece of music, said visual tag including an icon comprising a plurality of elements, each element carrying information relating to the piece of music;
combining the piece of music and the visual tag to compose a piece of music having the visual tag;
storing the composed piece of music having the visual tag into the memory of an electronic device;
repeating the above steps to form the music database, comprising the pieces of music having visual tags stored in the memory, for the electronic device.

7. The method of claim 6, further comprising receiving a highlighting of said visual tag and in response thereto displaying at least one additional element.

8. The method of claim 6, wherein each element carries information relating to one taken from a group comprising composer, performer, mood, main instrument, related drawing, personal feeling, impression level, melody curve and hot link.

* * * * *